No. 811,810. PATENTED FEB. 6, 1906.
M. M. WOOD.
LAMP GUARD.
APPLICATION FILED JULY 11, 1904.
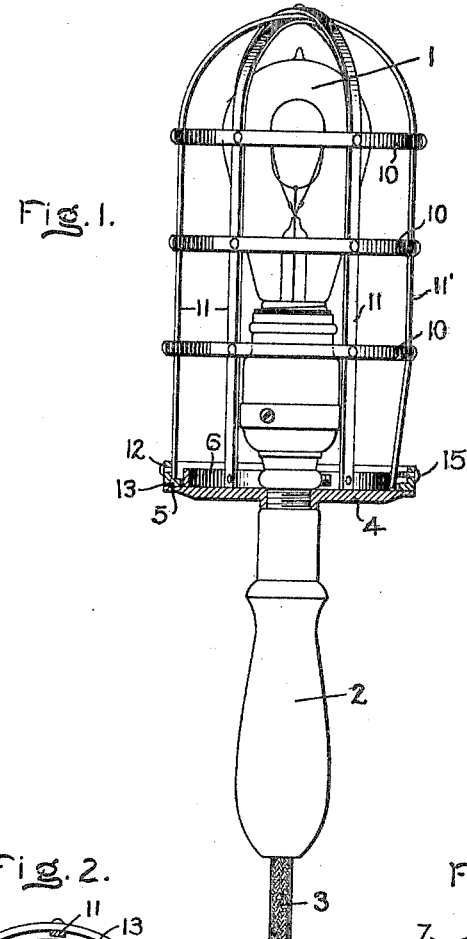
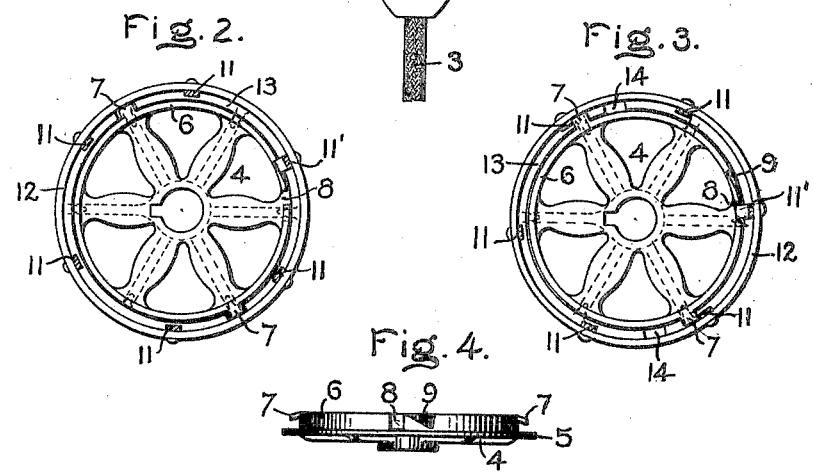
WITNESSES
INVENTOR:
Montraville M Wood,
By Albert G Davis,
Att'y.

UNITED STATES PATENT OFFICE.

MONTRAVILLE M. WOOD, OF SCHENECTADY, NEW YORK, ASSIGNOR TO GENERAL ELECTRIC COMPANY, A CORPORATION OF NEW YORK.

LAMP-GUARD.

No. 811,810.　　　Specification of Letters Patent.　　　Patented Feb. 6, 1906.

Application filed July 11, 1904. Serial No. 215,993.

*To all whom it may concern:*

Be it known that I, MONTRAVILLE M. WOOD, a citizen of the United States, residing at Schenectady, in the county of Schenectady and State of New York, have invented certain new and useful Improvements in Lamp-Guards, of which the following is a specification.

This invention relates to guards or cages for protecting incandescent electric lamps; and its object is to provide a simple and efficient mode of detachably securing the cage to its supporting-base, consisting in utilizing one of the ribs of the cage as a spring-catch to lock the cage after it has been bayonet-jointed to the base.

In the accompanying drawings, Figure 1 is a side elevation, partly in section, of a guard and lamp. Fig. 2 is a sectional plan view showing the cage and base put together, but not engaged. Fig. 3 is a similar view showing the same parts engaged and locked, and Fig. 4 is a side elevation of the supporting-base.

The lamp 1 is shown as mounted on the end of a handle 2, through which runs the flexible conducting-cord 3. Secured to the handle is the support or base for the cage, preferably in the form of a spider 4, integral with a ring 5, which has an upright flange 6, provided with two or more radial lugs 7, projecting from its upper edge. At one point the flange is cut away, leaving a notch 8, and adjacent to the notch the flange is beveled off at 9. The cage is composed of hoops 10, secured to ribs 11, whose lower ends are fastened to a ring 12, having an internal flange 13 containing notches 14, corresponding in position with the radial lugs 7 on the flange 6. The foot of one of the ribs 11' is left loose and is sprung inwardly, its play being limited by a headed pin 15, passing freely through a hole in the ring 12. When the cage is placed on the base, the ring 12 fits down outside of the flange 6, the notches 14 permitting the flange 13 to pass by the lugs 7 and rest on the ring 5 as the parts are brought together. The foot of the rib 11' comes in contact with the bevel 9 and is forced outwardly into the annular space between the flange 6 and the ring 12. The cage is now given a partial rotation, (clockwise in Fig. 2,) so that the flange 13 is carried under the lugs 7 to fasten the cage to the base. As soon as the rib 11' registers with the notch 8 in the flange 6 its resiliency carries it radially into said notch, and thus locks the cage from further rotation in either direction. It can be easily disengaged by pressing the rib 11' out of the notch 8 and turning the cage until the notches 14 register with the lugs 7.

What I claim as new, and desire to secure by Letters Patent of the United States, is—

1. In an incandescent-lamp guard, the combination with a supporting-base having a notched flange, of a cage adapted to be secured to said base by a bayonet-joint fastening, and locking means comprising a radially-movable cage-rib capable of engagement with said notched flange.

2. In an incandescent-lamp guard, the combination with a supporting-base having an upright flange provided with radial lugs and a notch, of a cage having a flanged ring containing notches to register with said lugs, and a rib having a loose foot adapted to spring into the notch in said upright flange and lock the cage to the base.

3. In an incandescent-lamp guard, the combination with a supporting-ring 5 having a flange 6 provided with lugs 7, a notch 8, and a bevel 9 adjacent to said notch, of a cage having a loose resilient rib 11', and a ring 12 provided with an internal flange 13 containing notches 14.

In witness whereof I have hereunto set my hand this 8th day of July, 1904.

MONTRAVILLE M. WOOD.

Witnesses:
　BENJAMIN B. HULL,
　HELEN ORFORD